(12) United States Patent
Delaney et al.

(10) Patent No.: US 11,663,361 B2
(45) Date of Patent: May 30, 2023

(54) APPLICATION-SPECIFIC SECURITY

(71) Applicant: Micron Technology, Inc., Boise, ID (US)

(72) Inventors: Claudia A. Delaney, Garden City, ID (US); Elsie de la Garza Villarreal, Nampa, ID (US); Madison E. Wale, Boise, ID (US); Bhumika Chhabra, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 23 days.

(21) Appl. No.: 16/871,210

(22) Filed: May 11, 2020

(65) Prior Publication Data

US 2021/0350012 A1 Nov. 11, 2021

(51) Int. Cl.
| | |
|---|---|
| *H04L 29/06* | (2006.01) |
| *G06F 21/62* | (2013.01) |
| *G06F 21/44* | (2013.01) |
| *H04L 9/40* | (2022.01) |

(52) U.S. Cl.
CPC ............ *G06F 21/629* (2013.01); *G06F 21/44* (2013.01); *H04L 63/20* (2013.01); *G06F 2221/2111* (2013.01); *G06F 2221/2113* (2013.01); *G06F 2221/2137* (2013.01)

(58) Field of Classification Search
CPC ................... G06F 21/629; G06F 21/44; G06F 2221/2111; G06F 2221/2113; G06F 2221/2137; H04L 63/20
USPC ........................................................... 726/2
See application file for complete search history.

(56) References Cited

U.S. PATENT DOCUMENTS

| | | | |
|---|---|---|---|
| 7,712,126 B2 * | 5/2010 | Andersson | H04L 63/105 726/1 |
| 11,017,107 B2 * | 5/2021 | Rungta | G06F 9/485 |
| 2008/0172715 A1 | 7/2008 | Geiger et al. | |
| 2010/0048167 A1 | 2/2010 | Chow et al. | |
| 2010/0175116 A1 * | 7/2010 | Gum | G06F 21/81 726/6 |
| 2014/0157401 A1 | 6/2014 | Mameh et al. | |
| 2014/0344896 A1 | 11/2014 | Pak et al. | |
| 2016/0147987 A1 | 5/2016 | Jang et al. | |

OTHER PUBLICATIONS

International Application No. PCT/US2021/028597—International Search Report and Written Opinion, dated Aug. 6, 2021, 9 pages.

* cited by examiner

*Primary Examiner* — Longbit Chai
(74) *Attorney, Agent, or Firm* — Perkins Coie LLP

(57) ABSTRACT

Embodiments for enabling or disabling application features according to application-specific security settings are described. The application-specific security settings can control when particular security levels, corresponding to authentication procedures, are required. The security levels can correspond to authentication procedures such as requiring no password, only requiring a PIN, allowing authentication by biometrics, or requiring a password. The application-specific security settings can control security levels based on a variety of circumstances such as setting particular security levels for particular locations, setting different security levels based on time since last device use, etc. In various implementations, the security levels can be mapped to application features to enable or disable.

18 Claims, 5 Drawing Sheets

APPLICATION-SPECIFIC SECURITY

TECHNICAL FIELD

The present disclosure is directed to granular security applied to individual applications at the application feature level.

BACKGROUND

Mobile devices are integral to modern life. Humans spend billions of hours each year interacting with their devices, performing actions such as getting directions, communicating with others, playing games, and many others. Typically, when a user restarts her device or puts her device aside for a time and then resumes using it, she is presented with a requirement to reauthenticate to resume using her device. This can happen to each of the billions of mobile device users multiple times per day, cumulatively consuming a significant amount of time and potentially causing frustration among users. A number of systems have been developed to make locking and unlocking devices easier and more efficient, such as fingerprint scanners and facial recognition systems. However, such systems still provide an unnecessary level of security to applications and device features that pose no security risk and therefore fail to fully alleviate the lost time and frustration of users.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
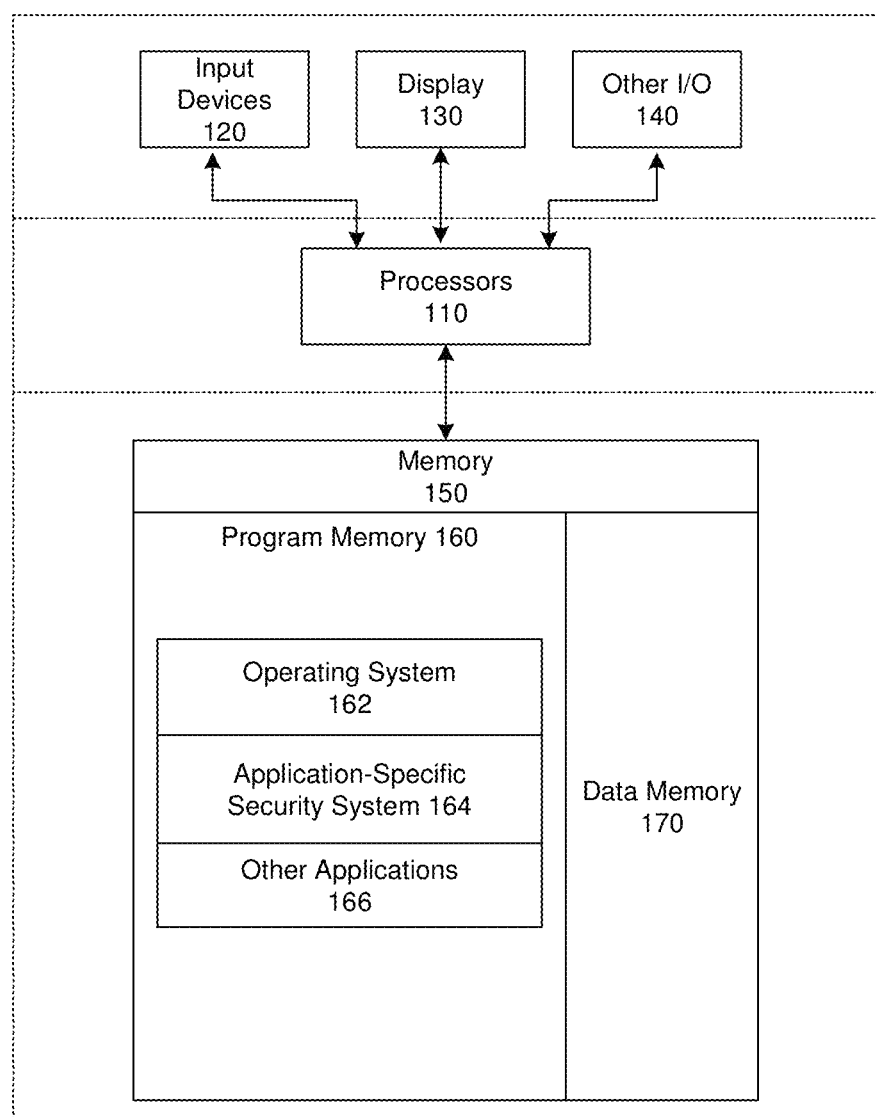
FIG. 1 is a block diagram illustrating an overview of devices on which some implementations can operate.

Embodiments for enabling or disabling application features according to application-specific security settings are described. The application-specific security settings can control when particular security levels, corresponding to authentication procedures, are required. The application-specific security settings can define a mapping of application features (e.g., being able to launch an application, specific internal application features, and/or internal application feature categories) to enable or disable for various security levels. In various implementations, the application-specific security settings can be set by a device administrator, a device user, or can be self-selected for applications by application developers. The security levels can correspond to authentication procedures such as requiring no password, only requiring a PIN (e.g., a four-digit number), allowing authentication by biometrics (e.g., fingerprint scanner, facial recognition, voice recognition, etc.), requiring a simple password, or requiring a strong password. The application-specific security settings can control security levels based on a variety of circumstances such as setting particular security levels for particular locations, setting different security levels based on time since last device use (e.g., varying lock screen timeout or setting amounts of disuse time between escalating the security level), etc. Different triggers can cause a security system to check the application-specific security settings such as upon a location change, at a set timeout, in response to a device unlock action or exit sleep action, upon device startup, when an application is activated, in response to an amount of inactive time, etc.

As an example, a mobile device can have multiple applications ("apps") installed. In this example, a first set of the apps was provided by an employer and has a security (e.g., mobile device management) policy specifying access can only be granted upon authentication with a secure password. A second set of the apps has application-specific security settings set by the device owner specifying that they should always be accessible without a password. A third set of the apps has application-specific security settings set by the device owner specifying that they should be accessible as long as the user is at her home geographical location. A fourth set of the apps has application-specific security settings set by the device owner specifying that their general functions should be available without a password but their internal features dealing with financial transactions should be disabled unless a security level with a password authentication is active.

Continuing the example, in operation, the device can determine security events when the device starts up, comes back from being in sleep mode, upon executing an app or certain app functions, upon set amounts of inactive time, or upon moving a threshold distance. Thus, when the user starts up her device, she can see a screen to enter her password or skip entering a password. Upon selecting the skip option (while she is away from her home location), only the second set of apps and the non-financial features of the fourth set of apps are available for use. When the user selects one of the apps in the first set, she is prompted to enter her password. Upon entering the password, she is authenticated into the highest security level, granting her access to all features of all apps. After a set time of not using her device, her security level is downgraded, again allowing her access only to the second set of apps and the non-financial features of the fourth set of apps. When the user arrives at her home location, the second set of apps, the third set of apps, and the non-financial features of the fourth set of apps become available. Upon selecting a financial feature of one of the fourth set of apps, the user is prompted to provide a corresponding password. Upon entering the password, she is granted access to the selected financial feature.

Existing authentication systems provide a variety of authentication methods such as passwords, personal identification numbers (PINs), voice recognition, face recognition, and fingerprint recognition. However, these systems are all concerned with a binary determination of whether a user matches a particular user account with assigned security settings. Such systems do not allow fine-grained control over using different (or no) authentication for different application features. In addition, these systems tend to provide security exploits as users who are frustrated with constantly having to enter their password select insecure passwords or repeat the same passwords across systems. Further, the constant requiring of users to enter passwords and checking password validity, often using network bandwidth to verify credentials with a server, wastes both processing power and battery life. The disclosed technology is expected to solve these problems, providing application-specific security settings with more flexible control over authentications on an application feature-by-feature basis. Further, this technology increases security by incentivizing users to select more secure passwords for features that require passwords, while allowing less secure authentication procedures for other features. Finally, by eliminating some instances of asking for and verifying user credentials, processing cycles and battery power are saved.

Several implementations are discussed below in more detail in reference to the figures. FIG. 1 is a block diagram illustrating an overview of devices on which some implementations of the disclosed technology can operate. The devices can comprise hardware components of a device 100 that provides application-specific security settings for security levels to enable or disable application features. Device 100 can include one or more input devices 120 that provide input to the processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, application-specific security system 164, and other application programs 166. Memory 150 can also include data memory 170, e.g., security policies and application-specific security settings defining security levels, keys for verifying credentials and biometrics, mappings of security levels to application features to enable or disable, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
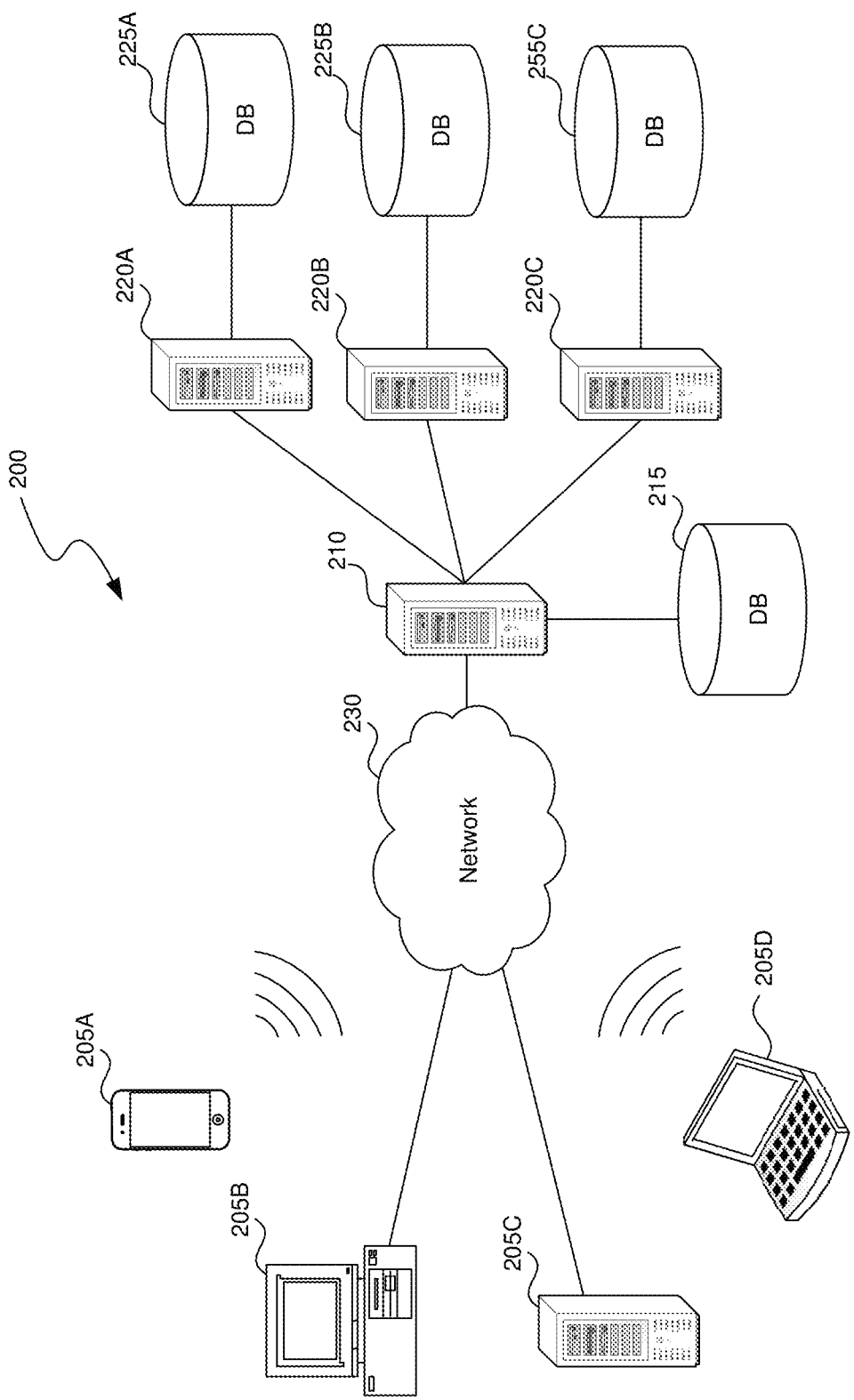
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device. In some implementations, the application-specific authorization system 164 can receive application-specific security settings in policies provided over network 230, e.g., by an employer or other device administrator. Also, in some cases, some authentication procedures set in the application-specific security settings of the application-specific authorization system 164 can specify that credential verification with a third party, over network 230, is required.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
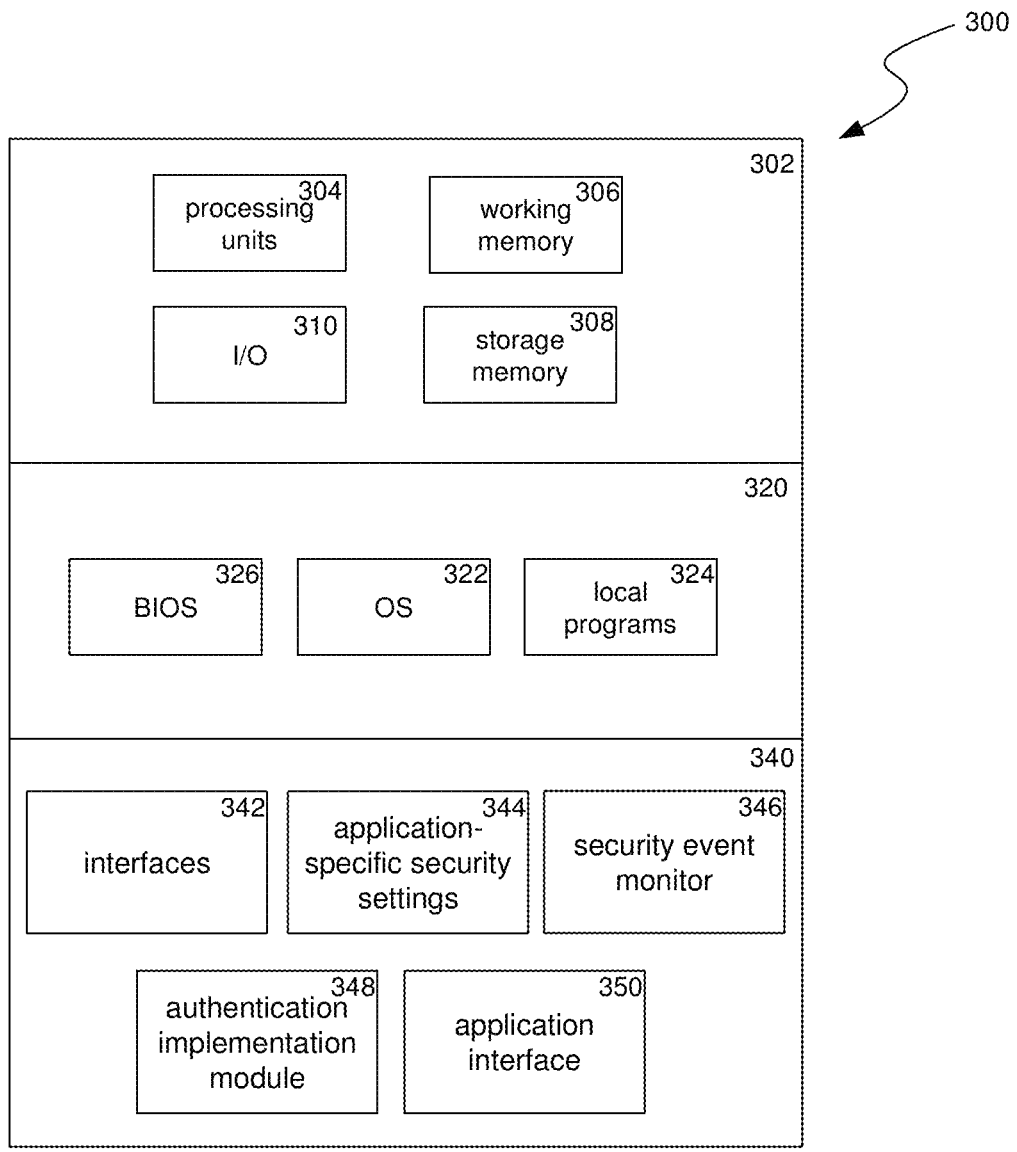
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include application-specific security settings 344, security event monitor 346, authentication implementation module 348, application interface 350, and components which can be used for providing user interfaces, transferring data, and other handles for controlling the specialized components, such as interfaces 342. In some implementations, components 300 can be in a computing system that is distributed across multiple computing devices or can be an interface to a server-based application executing one or more of specialized components 340.

The application-specific security settings 344 can be user, administrator, or application provider defined mappings between A) security levels and B) application features (e.g., whole applications, specific internal application features, and/or categories of internal application features) to enable or disable for particular security levels. The application-specific security settings 344 can also define which security events will cause a device to enter a security level and which authentication procedures are required for that security level. Additional details on application-specific security settings are discussed below in relation to blocks 402, 406, and 408 of FIG. 4.

The security event monitor 346 can identify security events mapped in the application-specific security settings 344. For example, the security event monitor 346 can identify a location change, an unlock event or a device sleep event, a device startup event, or an application activation event. Additional details on identifying security events are discussed below in relation to block 404 of FIG. 4.

The authentication implementation module 348 can perform authentication procedures defined for a security level defined by the application-specific security settings 344. For example, the authentication implementation module 348 can verify a received password, verify biometric information, verify a PIN, or determine that no authentication procedures are required for a security level change. Additional details on performing authentication procedures for a specified security level change are discussed below in relation to blocks 410 and 412 of FIG. 4.

The application interface 350 can cause one or more application features to be enabled or disabled according to the mapping defined in the application-specific security settings 344. The application interface can be invoked by the application-specific security settings 344 following an identified security event from security event monitor 346 and a successful authentication procedure by authentication implementation module 348. In some implementations, the enabling and/or disabling of whole applications can be performed via an operating system of the current device and the enabling and/or disabling of internal application features can be performed via API calls to the applications with those features. Additional details on enabling or disabling application features according to a security level are discussed below in relation to block 416 of FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
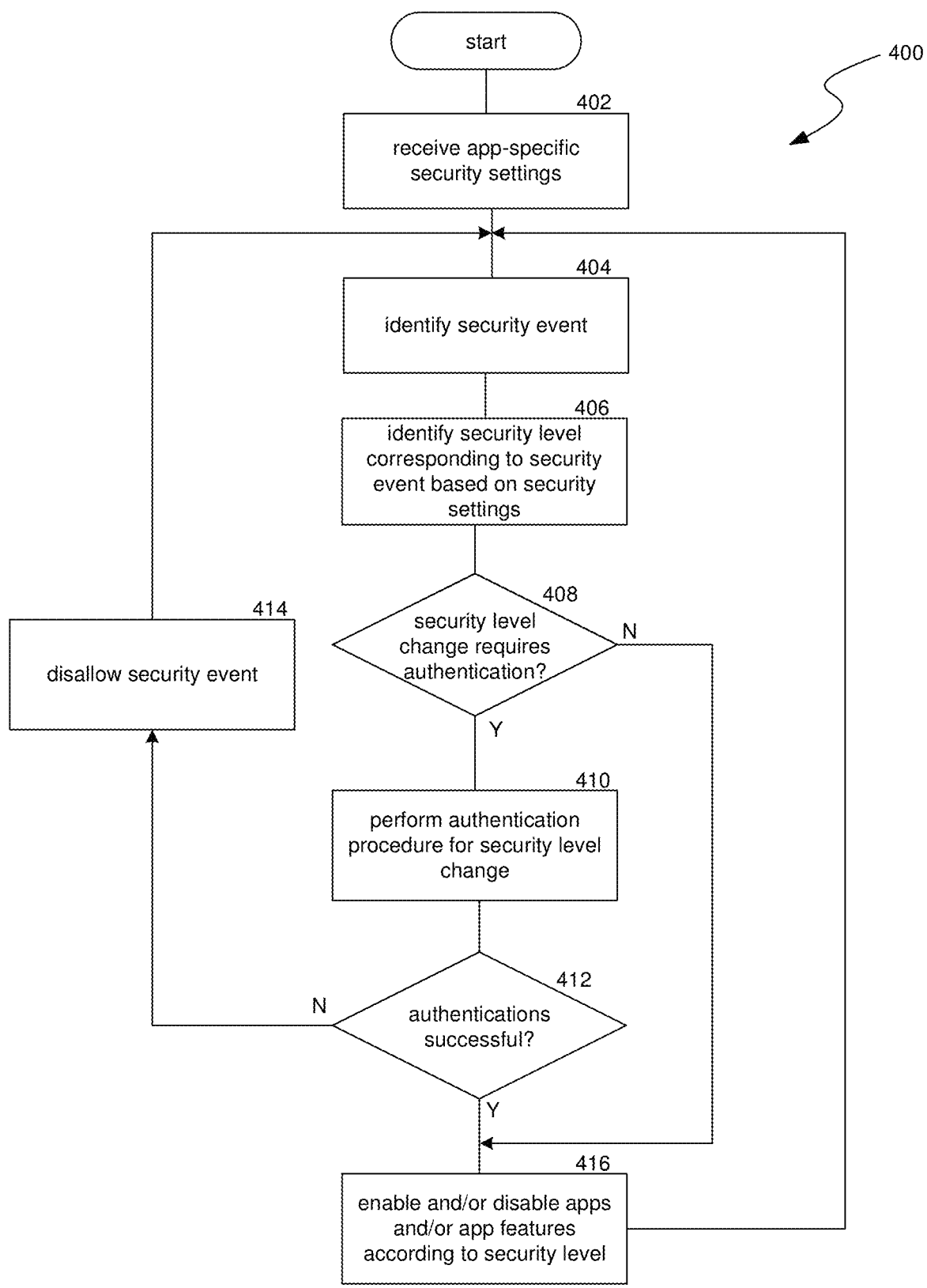
FIG. 4 is a flow diagram illustrating a process used in some implementations for enabling or disabling application features according to application-specific security settings.

FIG. 4 is a flow diagram illustrating a process 400 used in some implementations for enabling or disabling application features according to application-specific security settings.

At block 402, process 400 can receive application-specific security settings. In some implementations, some of the application-specific security settings can be received for a device through user interactions with the device. In some cases, some of the application-specific security settings can be received in a policy (e.g., a mobile device management policy) specified by a device administrator (e.g., over a network or when initially provisioning the device). In yet further cases, some of the application-specific security settings can be defined by applications themselves, where application permissions, settings defined by application developers, or access that the application has to data and/or hardware on the device can specify the permission levels required for use of that application.

The received application-specific security settings can specify security levels that correspond to authentication procedures and can also specify which application features (e.g., applications, internal application features, or types of internal application features) are enabled or disabled at that security level. In various implementations, the authentication procedures can include: no credentials required (always unlocked), specified biometrics are sufficient to enter the security level, a PIN is sufficient to enter the security level, a particular geographic location is required to enter the security level, or a password with particular characteristics (e.g., length, variety in characters, excluding common passwords, etc.) is required to enter the security level. In some implementations, the security levels can be defined in a hierarchy, such that an authentication procedure at a higher level in the hierarchy automatically unlocks security levels lower in the hierarchy. For example, a hierarchy can specify that a security level with an authentication procedure requiring a strong password automatically authenticates the user into security levels with biometric credentials or with geographic location requirements.

In some implementations, the application-specific security settings can specify additional features for activating, changing, or downgrading security levels. For example, the application-specific security settings can specify that the security levels should be reestablished when the device location changes, when a lock screen timeout occurs, upon a set period of device inactivity, when the device starts up, when an application is activated, etc. In some implementations, the application-specific security settings can specify different circumstances for different security level downgrade or re-authentication conditions. For example, different thresholds of device inactivity (e.g., periods without user input) can be specified to downgrade to particular security levels. As a more specific example, the application-specific security settings can specify that, after authenticating into a highest security level with a strong password, a timeout of 15 seconds downgrades the security level where a PIN will reestablish the highest security level, but after a timeout of one minute, the full strong password is required to achieve that highest security level.

The received application-specific security settings can also specify mappings of security levels to application features. In some cases, the application-specific security settings can define a group of one or more applications that will be enabled or disabled at a particular security level. In some implementations, the application-specific security settings can define a group of one or more specified application features, of particular applications, that will be enabled or disabled at a particular security level. In yet further implementations, the application-specific security settings can define one or more application feature categories that will be enabled or disabled at a particular security level. In some implementations, applications can provide APIs or other access points allowing access to the application to enable or disable particular features according to application-specific security settings or to assign a category to particular features. For example, a game application can include an API to enable or disable in-app purchases according to the current security level or to assign such features as a "financial impacting" feature which other application-specific security settings can assign to security levels. In addition, application developers can assign categories to application features which can be assigned to different security levels. In some implementations, the categories can be from a defined standard set of categories. In other instances, the system can query the application for names of defined categories, which the system can present to the user for assignment to security levels. The application-specific security settings can also specify defaults (enabled or disabled) for applications, application features, and/or application feature categories if they are not explicitly mapped as enabled or disabled for a current security level.

At block 404, process 400 can identify a security event. Security events can be different in different implementations. In some implementations, there are set security events for which the system monitors. In other implementations, the security event set can be dynamic, depending on the application-specific security settings. In particular, the application-specific security settings can be analyzed to determine which events can trigger a security level change, and those events become the set of security events. Examples of the events that can be security events include a threshold change in geographical location, a lock screen timeout, a device unlock action or device sleep event, a device startup event, an application activated, a threshold amount of inactive time (e.g., no user input or no detected inertial movement), etc.

At bock 406, process 400 can identify a security level corresponding to the security event identified at block 404. The identified security level can be based on a mapping defined by the application-specific security settings received at block 402.

At block 408, process 400 can determine a change in security levels is required by the security level identified for the identified security event. As discussed above, in some implementations, security levels can be defined in a hierarchy, such that an authentication procedure at a higher level in the hierarchy automatically unlocks security levels lower in the hierarchy. Process 400 can determine if the security level identified at block 406 is the same as a current security level or below the current security level in the hierarchy, in which case, process 400 can proceed to block 416. In some cases, the change in security levels can be a downgrade in security levels, such as when a lock screen timeout occurs. In these cases no authentication is required to disable application features, so process 400 can immediate make the security level change and proceed to block 416. However, if the security level identified at block 406 requires a change in authentication as compared to the current security level, process 400 can proceed to block 410.

At block 410, process 400 can perform the authentication procedures required for the change in security levels from the current level to the security level identified at block 406. In some implementations, the authentication procedures are defined by the new security level, e.g. one or more of a password, biometrics, a PIN, etc., is required. In other cases, the authentication procedures can be defined based on a difference between the current security level and the new security level. For example, if the current security level required biometrics, only a PIN may be needed to escalate to the new security level, but if no authentication was required for the current security level, a strong password may be required to authenticate to the new security level. In some implementations, the context can also affect the authentication procedures required. For example, if the user was previously authenticated into a password-level security level, but a timeout caused a downgrade in security levels, within a threshold amount of time the user may be able to reestablish her authentication into the password-level security level with a PIN.

At block 412, process 400 can determine whether the authentication procedures performed at block 410 were successful. If so, process 400 can make the security level change and proceed to block 416. If not, process 400 can proceed to block 414, where the security event is disallowed, e.g., no change in security levels is performed and no change to application feature enablement is performed. From block 414, process 400 can return to block 404 as it continues to monitor for additional security events.

At block 416, process 400 can enable or disable application features according to the new security level. As discussed above, the enabled or disabled security levels can be based on the mapping defined by the application-specific security settings received at block 402. In various implementations, enabling or disabling applications can be performed in conjunction with an operating system or configurations of the applications themselves. As discussed above, disabling individual features or categories of features within applications can be performed through protected application setting files and/or API calls to the applications. From block 416, process 400 can return to block 404 as it continues to monitor for additional security events.

Figure 5B:
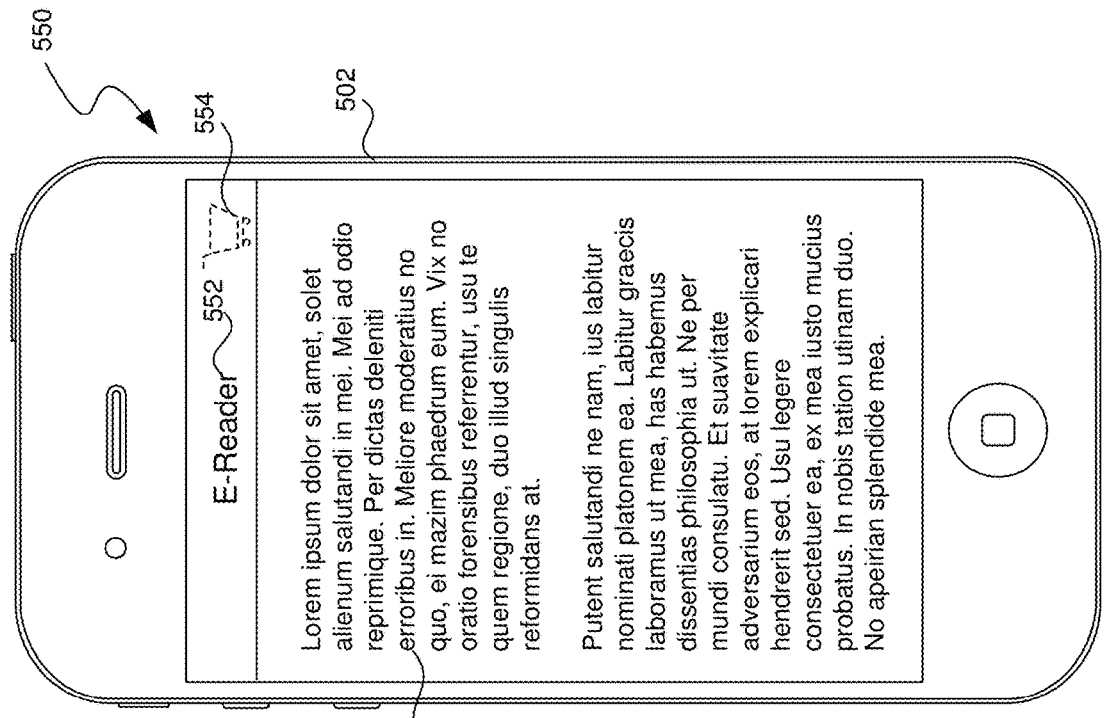
FIG. 5B is a conceptual diagram illustrating an example of enabling or disabling internal application features according to application-specific security settings.
Figure 5A:
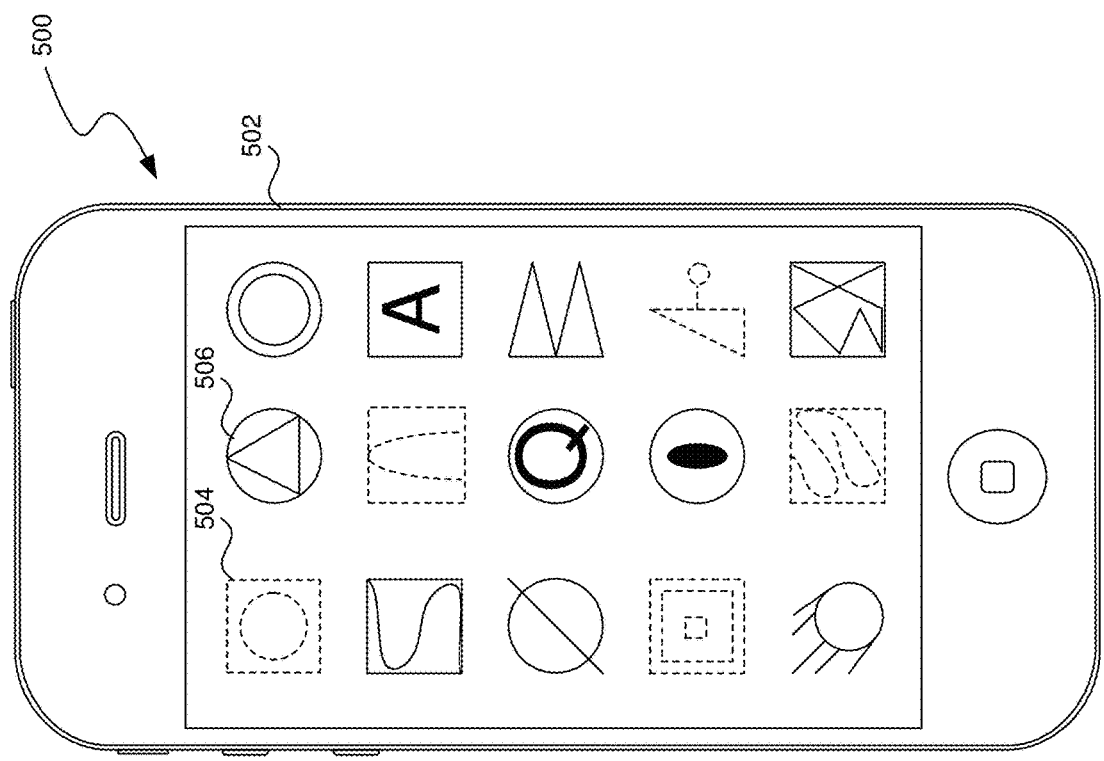
FIG. 5A is a conceptual diagram illustrating an example of enabling or disabling applications according to application-specific security settings.

FIG. 5A is a conceptual diagram illustrating an example 500 of enabling or disabling whole applications according to application-specific security settings. Example 500 shows a mobile device 502 with icons for a number of installed applications, including applications 504 and 506. In example 500, a security level has been set that is mapped to enable some applications (shown in solid lines, e.g., application 506) and disable others (shown in dashed lines, e.g., application 504). If a user taps one of the enabled applications, she is able to use it. However, if she taps one of the disabled applications, it will trigger a security event causing her to perform an authentication procedure for a higher security level before being able to access that application.

FIG. 5B is a conceptual diagram illustrating an example 550 of enabling or disabling internal application features according to application-specific security settings. Example 550 shows the mobile device 502 with an E-Reader application 552 running. The E-Reader application 552 has a number of features such as a reading pane 556 and a shopping cart 554. In example 500, a security level has been set that is mapped to enable all non-financial application features. The developer of the E-Reader application 552 has classified the shopping cart feature 554 as a financial feature but not the reading pane 556. Thus, the user is able to utilize the reading pane 556 but not the shopping cart feature 554 (as designated by the shopping cart feature 554 being shown in dashed lines). If the user taps the shopping cart feature 554, it will trigger a security event causing her to perform an authentication procedure for a higher security level before being able to access the shopping cart feature 554.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method comprising:
   receiving security settings specifying a mapping of security events to security levels and the security levels to application features that are enabled or disabled for a particular security level, wherein each security level defines authentication procedures required to achieve that security level, and wherein the security settings define, for each security level of the security levels, respective application features internal to respective applications from a plurality of applications installed on a device that are enabled or disabled for that particular security level, the respective application features including features other than launching the respective application, wherein the respective application features internal to the respective applications that are defined as enabled or disabled for that particular security level are based on input from at least one application provider of the respective applications;

identifying a security event corresponding to one of the security settings, the security event including lapse of a threshold amount of inactivity time;

applying the mapping to the identified security event to determine a change from a previous security level to a new security level;

performing an authentication procedure defined for the new security level, the authentication procedure enabling an authentication password to be skipped for one or more application features of some but not all of the plurality of applications; and in response to the authentication procedure being successful and based on the security settings associated with the new security level, enabling the respective application features internal to the respective applications defined as enabled in the new security level, wherein the respective application features were disabled in the previous security level.

2. The method of claim 1, wherein enabling the respective application features internal to the respective applications defined as enabled in the new security level is based on a category of the respective application features.

3. The method of claim 2, wherein the category of the respective application features internal to the respective applications defined as enabled in the new security level was identified by the at least one provider of the respective applications.

4. The method of claim 2, wherein the category of the respective application features was identified via a user causing an API call to an application of the respective applications to obtain access to an application feature of the respective application features.

5. The method of claim 1, wherein enabling the respective application features internal to the respective applications defined as enabled in the new security level includes making an API call to an application of the respective applications.

6. The method of claim 1, wherein the authentication procedure defined for the new security level is defined based on a context including a difference between the previous security level and the new security level.

7. The method of claim 1, wherein at least some of the security settings are defined by a policy received over a network from a remote source.

8. The method of claim 1, wherein at least some of the security settings define application features that can be accessed at a security level with an authentication procedure with no required authentication user input.

9. The method of claim 1,
wherein the security event further comprises determining a location change to a new location;
wherein the authentication procedure comprises determining that the new location is in an identified safe zone defined in a security setting as mapped, in the mapping, to the security event, and
wherein the respective application features internal to the respective applications defined as enabled in the new security level are enabled in response to the authentication procedure without requiring further authentication input from a user.

10. The method of claim 1,
wherein at least some of the security settings map to a security event comprising a first timeout that, when the first timeout expires, disables a first set of application features; and wherein at least some of the security settings map to a security event comprising a second timeout that, when the second timeout expires, disables a second set of application features.

11. A system comprising:
one or more processor devices; and
one or more memories storing instructions that, when executed by the one or more processors, cause the computing system to perform operations comprising:
identifying a security event corresponding to one or more application-specific security settings, the security event including lapse of a threshold amount of inactivity time, wherein the application-specific security settings specify a mapping of security events to security levels and the security levels to application features that are enabled or disabled for a particular security level, wherein each security level defines authentication procedures required to achieve that security level, and wherein the application-specific security settings define, for each security level of the security levels, respective application features internal to respective applications from a plurality of applications installed on a device that are enabled or disabled for that particular security level, the respective application features including features other than launching the respective application, wherein the respective application features internal to the respective applications that are defined as enabled or disabled for that particular security level are based on input from at least one application provider of the respective applications;
applying the mapping to the identified security event to identify a change from a previous security level to a new security level;
performing an authentication procedure defined for the new security level, the authentication procedure enabling an authentication password to be skipped for one or more application features of some but not all of the plurality of applications; and
in response to the authentication procedure being successful and based on the application-specific security settings associated with the new security level, enabling the respective application features internal to the respective applications defined as enabled in the new security level, wherein the respective application features were disabled in the previous security level.

12. The computing system of claim 11, wherein enabling the respective application features internal to the respective applications defined as enabled in the new security level is based on a category of the respective application features.

13. The computing system of claim 12, wherein the category of the respective application features was identified via a user causing an API call to an application of the respective applications to obtain access to an application feature of the respective application features.

14. The computing system of claim 11, wherein at least some of the application-specific security settings are defined by a policy received over a network from a remote source.

15. The computing system of claim 11, wherein at least some of the application-specific security settings define application features that can be accessed at a security level with no authentication required.

16. The computing system of claim 11,
wherein the security event further comprises determining a location change to a new location;

wherein the authentication procedure comprises determining that the new location is in an identified safe zone defined in an application-specific security setting mapped, in the mapping, to the security event, and wherein the respective application features internal to the respective applications defined as enabled in the new security level are enabled in response to the authentication procedure without requiring further authentication input from a user.

17. A non-transitory computer-readable storage medium storing instructions that, when executed by a computing system, cause the computing system to perform operations comprising:

receiving security settings specifying a mapping of security events to security levels and the security levels to application features that are enabled or disabled for a particular security level, wherein each security level defines authentication procedures required to achieve that security level, and wherein the security settings define, for each security level of the security levels, respective application features internal to respective applications from a plurality of applications installed on a device that are enabled or disabled for that particular security level, the respective application features including features other than launching the respective application, wherein the respective application features internal to the respective applications that are defined as enabled or disabled for that particular security level are based on input from at least one application provider of the respective applications;

identifying a security event corresponding to one of the security settings, the security event including lapse of a threshold amount of inactivity time;

applying the mapping to the identified security event to determine a change from a previous security level to a new security level;

performing an authentication procedure defined for the new security level, the authentication procedure enabling an authentication password to be skipped for one or more application features of some but not all of the plurality of applications; and in response to the authentication procedure being successful and based on the security settings associated with the new security level, enabling the respective application features internal to the respective applications defined as enabled in the new security level, wherein the respective application features were disabled in the previous security level.

18. The computer-readable storage medium of claim 17, wherein at least some of the security settings define application features that can be accessed at a security level with no authentication required.

* * * * *